United States Patent [19]
Lang et al.

[11] Patent Number: 5,628,665
[45] Date of Patent: May 13, 1997

[54] GLOVE BOX

[75] Inventors: Dieter Lang, Holzkirchen; Anton Schloegl, Langweid; Dieter Deckardt, Augsburg, all of Germany

[73] Assignee: Patent-Treuhand-Gesellschaft F. Elektrische Gluehlampen mbH, Munich, Germany

[21] Appl. No.: 449,428

[22] Filed: May 24, 1995

[30] Foreign Application Priority Data

Jun. 29, 1994 [DE] Germany ............... 44 22 419.2

[51] Int. Cl.$^6$ ............................................. H01J 9/38
[52] U.S. Cl. ....................................... 445/73; 445/71
[58] Field of Search ........................... 445/70, 71, 73

[56] References Cited

U.S. PATENT DOCUMENTS

| | | | |
|---|---|---|---|
| 2,927,679 | 3/1960 | Rively | 445/71 |
| 4,799,912 | 1/1989 | Salgó | 445/26 |
| 4,993,981 | 2/1991 | Ose et al. | 445/70 |
| 5,108,333 | 4/1992 | Heider et al. | 445/26 |
| 5,496,201 | 3/1996 | Hwang | 445/38 |

FOREIGN PATENT DOCUMENTS

| | | |
|---|---|---|
| 0309351A1 | 3/1989 | European Pat. Off. . |
| 1250185 | 11/1960 | France . |
| 1282653 | 12/1961 | France . |
| 2293288 | 12/1974 | France . |

*Primary Examiner*—P. Austin Bradley
*Assistant Examiner*—Jeffrey T. Knapp
*Attorney, Agent, or Firm*—Frishauf, Holtz, Goodman, Langer & Chick, P.C.

[57] ABSTRACT

The glove box has a rotatably supported bottom member (2, 11, 51) which is equipped with a number of product holders (14) positioned concentrically with the rotational axis of the bottom member. The product holders receive subassemblies or precursor products to be processed, partly within and partly without the glove box. Typical precursor products are discharge vessels for discharge lamps, of small size, for example having discharge vessel volumes in the tenths and hundredths of a cubic centimeter, which are to be flushed with a flushing gas, and then filled with an ionizable fill. Rotation of the bottom member delivers the products in the product holders to work-stations at which flushing, filling and other operations are carried out inside the glove box. Simultaneously, other operations such as pinching and sealing portions of the discharge vessels can be carried out outside of the glove box by suitable outwardly located operating stations (18). The bottom member is rotated in synchronism with the cadence or operating cycles of the respective operating stations. This permits simultaneous processing of the products within the glove box in a protective gas atmosphere while also operating thereon outside of the glove box.

15 Claims, 4 Drawing Sheets

GLOVE BOX

FIELD OF THE INVENTION.

The present invention relates to a glove box to contain a protective gas atmosphere. More particularly, the invention relates to a glove box in which gas discharge lamps, for which extremely high demands are made in terms of filling purity, are supplied with an ionizable filling.

BACKGROUND

When manufacturing low-wattage high-pressure discharge lamps on a lamp-making machine, the ionizable filling must be introduced into the discharge vessel with particular care. Because low-wattage high-pressure discharge lamps have relatively small discharge volumes and correspondingly small metered amounts of filing components, even slight contamination of the discharge volume can affect the light output of the lamp or can even cause the lamp to fail. Thus, flushing and filling processes carried out with a conventional pump stand of the type used for other gas discharge lamps, entail considerable risks.

The production of sodium high-pressure discharge lamps is typically carried out for the most part inside a glove box in a protective gas atmosphere. For processing, precursor products or subassemblies, the sodium high-pressure discharge lamps themselves are fed in batches to the interior of the glove box through one or more gates. Tools are located in the interior of the glove box for processing and/or working on the lamps and/or the lamp precursor products. These tools or the work-stations are interrelated by a transport system for the lamps and/or lamp precursor products. They are highly automated in order to provide high output.

This technology, however, cannot readily be adapted to the manufacture of other high-pressure discharge lamps, such as mercury vapor high-pressure discharge lamps or halogen metal vapor high-pressure discharge lamps, since some of the production steps required for these lamps, such as sealing off the ends of the discharge vessels and freezing out the noble gas filling component, can be accomplished in a glove box only at very high and hardly acceptable technological effort and expense.

Moreover, the high degree of automation of the procedures within the glove box may lead to a slight contamination from dust, abrasion, and lubricant vapors, which contamination can no longer be tolerated in the manufacture of discharge lamps having extremely small discharge volumes down to 0.03 cm$^3$ and correspondingly small amounts of metered filling components. Such lamps are used, for example, as low-wattage high-pressure discharge lamps in motor vehicle headlights. On the other hand, if a high throughput capacity is to be attained, it is impossible to dispense with the high degree of automation of the procedures even in the manufacture of low-wattage high-pressure discharge lamps.

THE INVENTION

Accordingly, it is an object of the present invention to provide a glove box that is usable for manufacturing products, especially electric lamps, in which high demands are made on the purity of the protective gas atmosphere in the interior of the glove box, and which provides a high output or throughput capacity or capability.

Briefly, the glove box according to the invention has side parts and at least one top part and a bottom member that is rotatable about a, preferably rotatable, axis. The bottom member, the side parts, and the at least one top part are connected together to form a gas-tight sealed interior which contains a protective gas atmosphere. A number of product holders are secured to the bottom member for retaining precursor products or subassemblies or semi-finished products that are to be processed. Each of the product holders has a duct that can be closed in a gas-tight manner.

The product holders are arranged along a circle or a circular arc, that is concentric with the rotational axis of the bottom member. The product holders retain the precursor products or the semi-finished products such that one subregion or partial region, or portion of the precursor products or of the semi-finished products is accessible to processing devices located inside the glove box in the protective gas atmosphere.

At the same time another subregion or portion of the precursor products or semi-finished products is accessible to tools or work-stations located outside the glove box.

This arrangement makes it possible to perform inside the glove box only those procedures that absolutely must be carried out in a protective gas atmosphere, while all remaining production steps can take place outside of the glove box. Thus, only the processing devices or work-stations required for carrying out the procedures that take place in the protective gas atmosphere need be mounted in the interior of the glove box, while all the remaining tools or stations can be arranged outside of the glove box. This arrangement considerably reduces any contamination which might occur in the glove box protective gas atmosphere.

The glove box according to the invention permits that the precursor products or semi-finished products to be processed no longer need to be fed into the interior of the glove box in batches. Additionally, the glove box of the present invention does not require transport systems in its interior for the precursor products or semi-finished products to be processed.

The processing devices, work-stations and/or tools are located above and below the circle or arc defined by the product holders, so that when the glove box bottom rotates in synchronism with the operating rhythm, or cadence, or cycle of the processing devices and tools, the precursor products, subassemblies or semi-finished products retained in the product holders are supplied directly to the various processing devices or stations and tools. This makes it possible to achieve a very high throughput.

Preferably, the bottom member of the glove box is sealed with an annular seal that has dry slide bearing segments that are pressed against the bottom member of the glove box. The required contact pressure is generated, in one embodiment, by an inflatable annular hose located in the glove box wall, above the seal. It is also possible to generate the necessary contact pressure in other ways. For example, in a second embodiment, the requisite contact pressure is assured with the aid of roller blocks, which precisely position the relatively movable elements, that is, the bottom member of the glove box and the hood of the glove box, with respect to one another.

The seal itself is provided with a circumferential barrier channel that is flushed with inert gas, to prevent air from diffusing into the interior of the glove box. The gas pressure inside the glove box is advantageously slightly above the air pressure prevailing outside the glove box, so that invasion of air and other contaminants into the interior of the glove box is made difficult.

DRAWINGS

DETAILED DESCRIPTION

Figure 1:
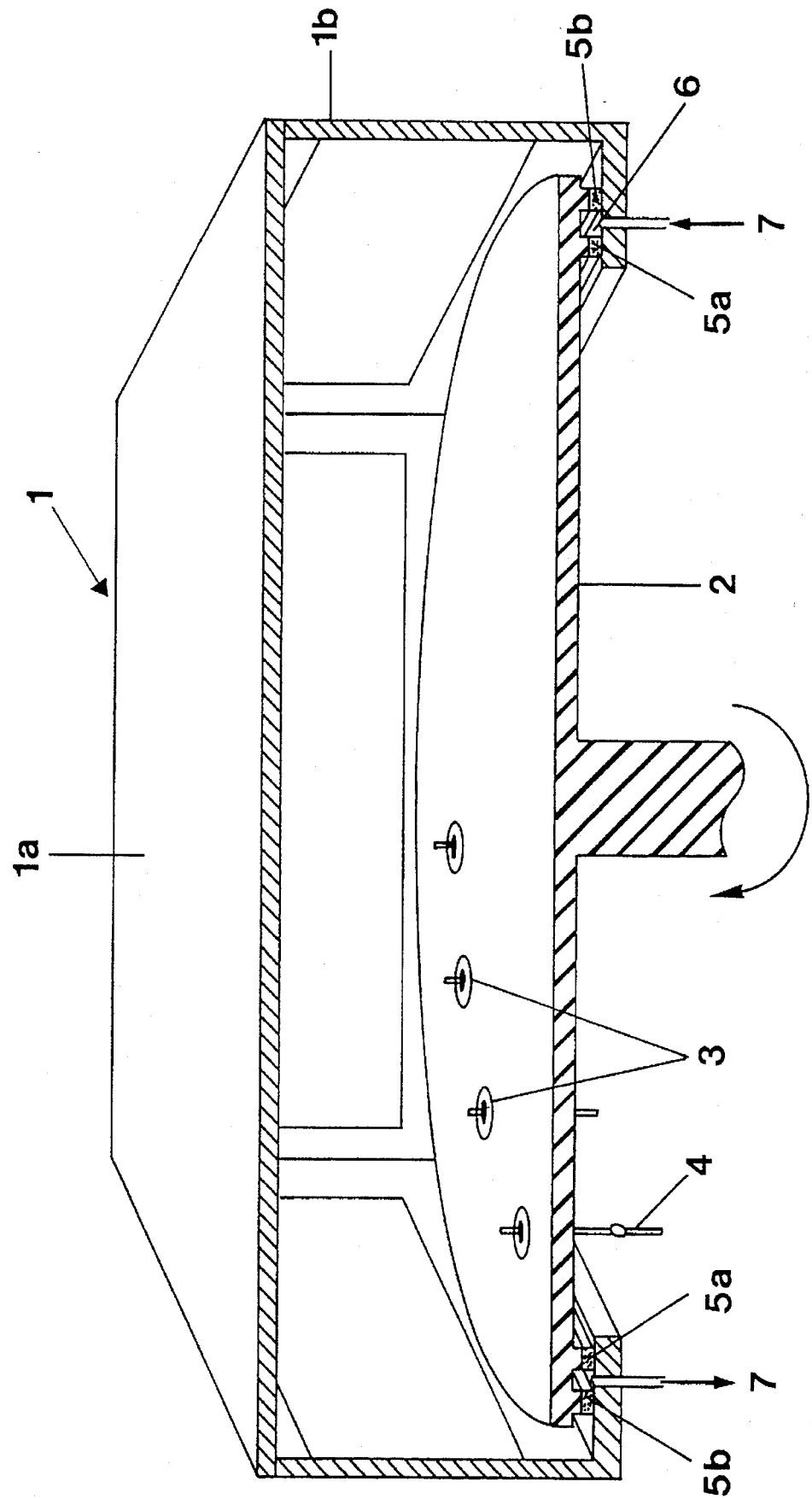
FIG. 1 is a highly schematic cross section of a glove box pursuant to the present invention.

FIG. 1 illustrates the basic principle of the glove box according to the present invention in a highly schematic form. The glove box has a hood 1 with a top part 1a and a side part 1b, and a rotatably supported bottom member 2. The bottom member 2 is equipped with a number of product holders 3 for retaining precursor products 4. The precursor products 4 shown are discharge vessels of low-wattage high-pressure discharge lamps. The upper end of the discharge vessel 4 is located in the interior of the glove box 1 in a protective gas atmosphere, so that the discharge volume communicates with the protective gas atmosphere, while the lower end of the discharge vessel 4 is located outside the glove box 1.

The introduction of filling components can now be carried out in a protective gas atmosphere by utilizing processing devices or operating stations mounted inside the glove box. By rotating the bottom member 2 of the glove box in synchronism with the operating cycles of the lamp-making machine, the discharge vessels 4 retained in the product holders 3 are delivered to the various processing stations and their tools inside and outside the glove box 1. A seal 5a, 5b of the bottom member 2 of the glove box has double walls that define an annular barrier channel 6 with is flushed with inert gas 7.

Figure 2:
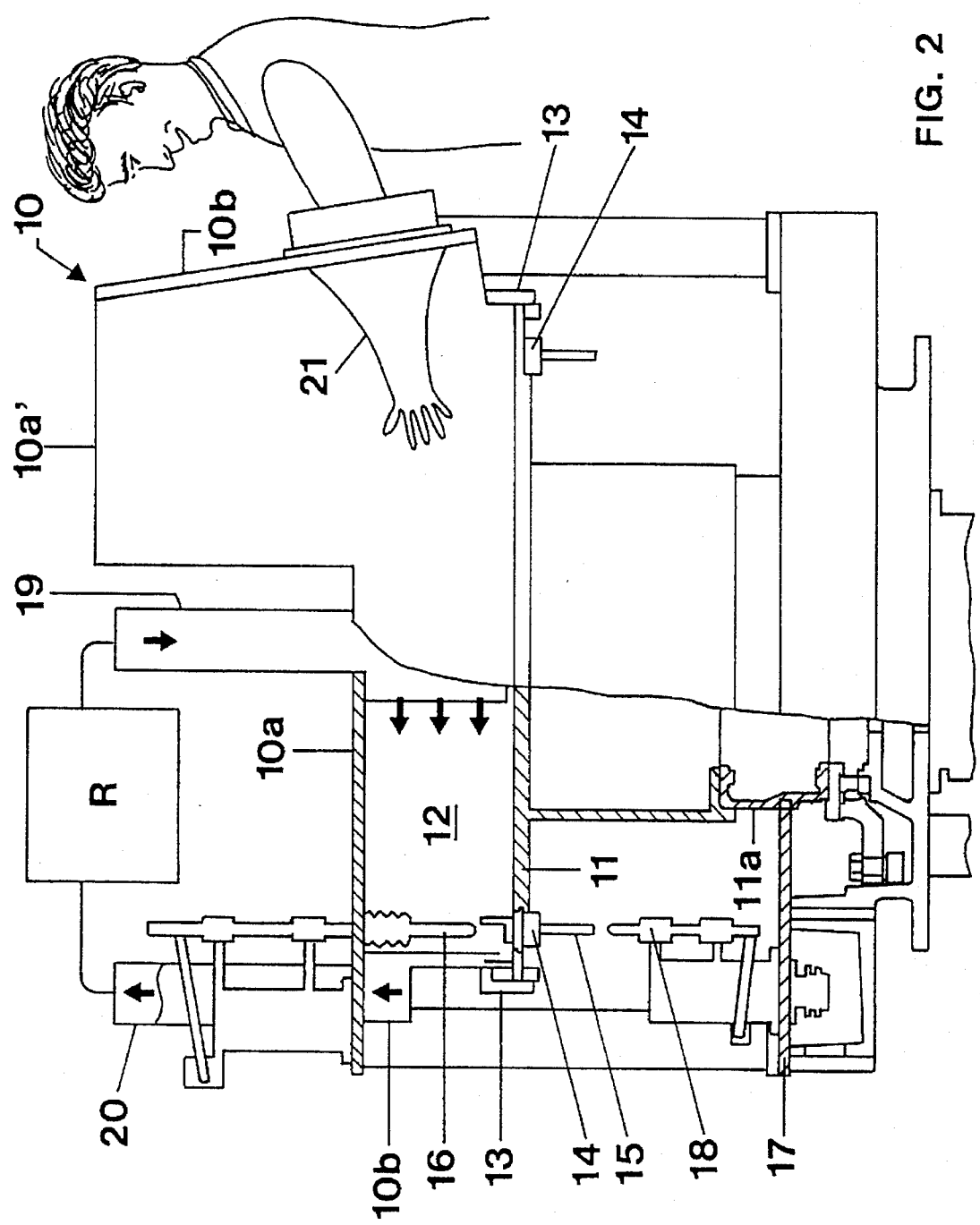
FIG. 2 is a side view of the glove box according to the invention, partly in section.

FIG. 2 is a more detailed side view, partly in section, of a glove box according to the present invention. This glove box includes a hood 10 having top parts 10a, 10a' and side parts, 10b, as well as a bottom member 11. The hood 10 and bottom 11, together define a sealed gas-tight interior 12. The glove box interior 12 is accessible for manual manipulations by gloves 21 that are joined in a gas-tight manner to the side part 10b and protrude into the interior 12 of the glove box.

The glove box bottom member 11 is a circular disc. It is supported so as to be rotatable about its vertical axis via a ring 11a. The diameter of the bottom 11 is approximately 110 cm. An annular seal 13 is arranged between the edge of the bottom member 11 and the side part 10b of the hood 10. Twenty-four product holders 14 are mounted on the bottom member 11, equidistantly spaced along a circle extending concentrically with the vertical axis of the bottom member. Each of the product holders 14 retains a discharge vessel 15 of a high-pressure discharge lamp.

The top part 10a of the hood is located parallel to the bottom member 11 of glove box and serves as a mounting platform for processing devices 16, shown only schematically, which are mounted in the interior 12 of the glove box. These processing devices 16 are located above the product holders 14 along the circle defined by the product holders 14. A second, stationary mounting platform 17 is located below and parallel to the rotatable bottom member 11 of the glove box. The second mounting platform 17 is equipped with work-stations and tools 18 which are used for processing the discharge vessels 15 outside interior 12 of the glove box. These work-stations 18 carry out such production steps as heating or pinching of the discharge tube vessel ends, for example, whereas the processing devices 16 within the glove box interior 12 have the task of introducing the filling components into the discharge volume. The bottom member 11 of the glove box rotates in synchronism with the operating cycles of the processing devices 16 and the stations and tools 18 so that the discharge vessels 15 retained in the product holders 14 are delivered in succession to the devices 16 and the stations and tools 18 at the various processing stations.

The interior 12 of the glove box contains an argon atmosphere, whose gas pressure is slightly above the air pressure external to the glove box in order to prevent the incursion of air or other contaminants into the glove box. The argon undergoes a circulation process in which it is delivered to the glove box interior 12 from an argon cleaning system R via a supply line 19 mounted axially in the top part 10a of the hood 10. The argon is returned to the argon cleaning system R via suction removal devices 20 mounted eccentrically in the top part 10a. This arrangement, on the one hand, creates a radially outward-oriented flow in the interior 12 of the glove box and, on the other hand, flushes the sealing region 13 with argon so that a diffusion of air inward is prevented. The course of the flow is represented by arrows in FIG. 2.

Details of the seal 13 and the product holder 14 will next be described in connection with FIG. 3.

Figure 3:
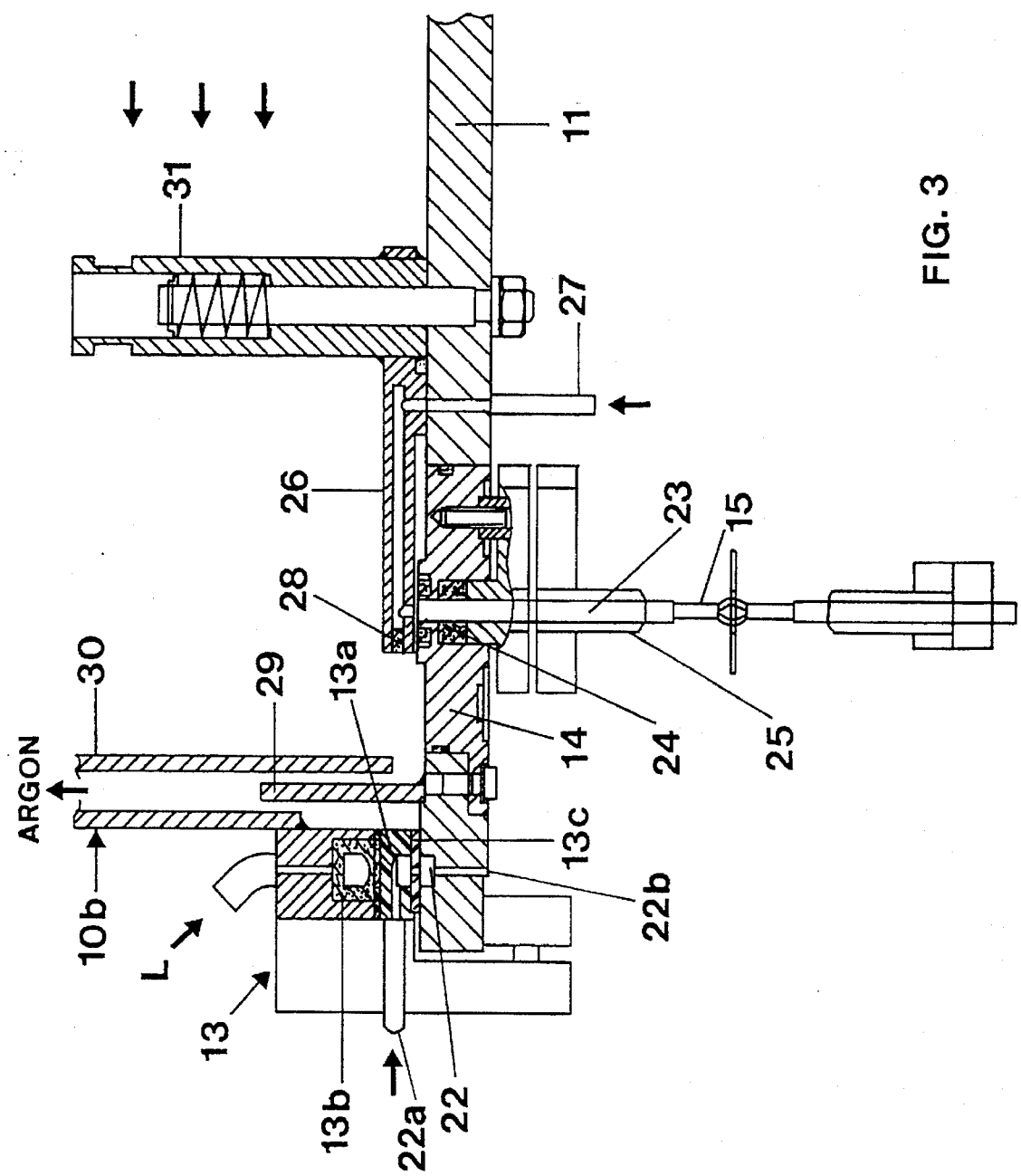
FIG. 3 is a cross section through a first embodiment of a seal of the bottom member of the glove box, and a product holder.

Construction of the seal of FIG. 3

The seal 13, in a first embodiment, has a sealing ring 13a having a U-shaped cross section which has two concentric annular sealing faces. The seal 13 further includes an inflatable annular hose 13b and dry slide bearing segments 13c which are adhesively bonded to the sealing faces. The hose 13b can be inflated by compressed air L and the sealing ring 13a, with the dry slide bearing segments 13c, is pressed against the bottom member 11 of the glove box. The dry slide bearing segments 13c comprise polytetrafluorethylene, known as TEFLON® or a vinylidene-fluoride-hexafluorpropylene copolymerizate, known as VITON®. If slide bearing segments for seal 13 are made of VITON® they should also be lubricated with high-vacuum grease. The U-shaped sealing ring 13a and a recess in the bottom member 11 of the glove box define a barrier channel 22, which is flushed with argon through a tube 22a. Argon is introduced through tube 22a, and leaves than channel 22 through a duct 22b. The bottom member 11 of the glove box and the lower portion 10a of the top part of the hood, acting as a mounting platform, are equipped with overlapping partitions 29, 30 that extend parallel to the side part 10b of the hood and shade off the sealing region from the remaining interior 12 of the box. Any gaseous contaminants that may have entered through the seal 13 are carried off here, together with the argon, by the suction removal devices 20 to the argon cleaning system R.

The product holders 14 are screwed to the bottom member 11 in a gas-tight manner. The product holders 14 have a cylindrical duct 23, which pierces the bottom member 11 of the glove box and is equipped with a tightenable sealing ring 24. The tubular extension of the discharge vessel 15, which is fixed in a mounting frame 25, is retained in a gas-tight manner in the duct 23 so that the discharge volume of vessel 15 can communicate with the interior 12 of the glove box. The opening of the duct 23 toward the glove box interior 12 is connected, as shown on FIG. 3 in a gas-tight manner to a flushing channel 26 of an argon flushing device 27, shown only schematically, which serves to flush the discharge volume. Flushing device 27 is coupled to the rotary bottom 11 by a suitable rotary joint as well known in the art, or could be similar to seal 13. The flushing channel 26 is secured to a frame 31 and can be removed from the product holder 14 by lifting and rotating the frame 31, so that the filling components and the upper electrode system can be introduced into the discharge vessel 15 from the glove box interior 12.

Figure 4:
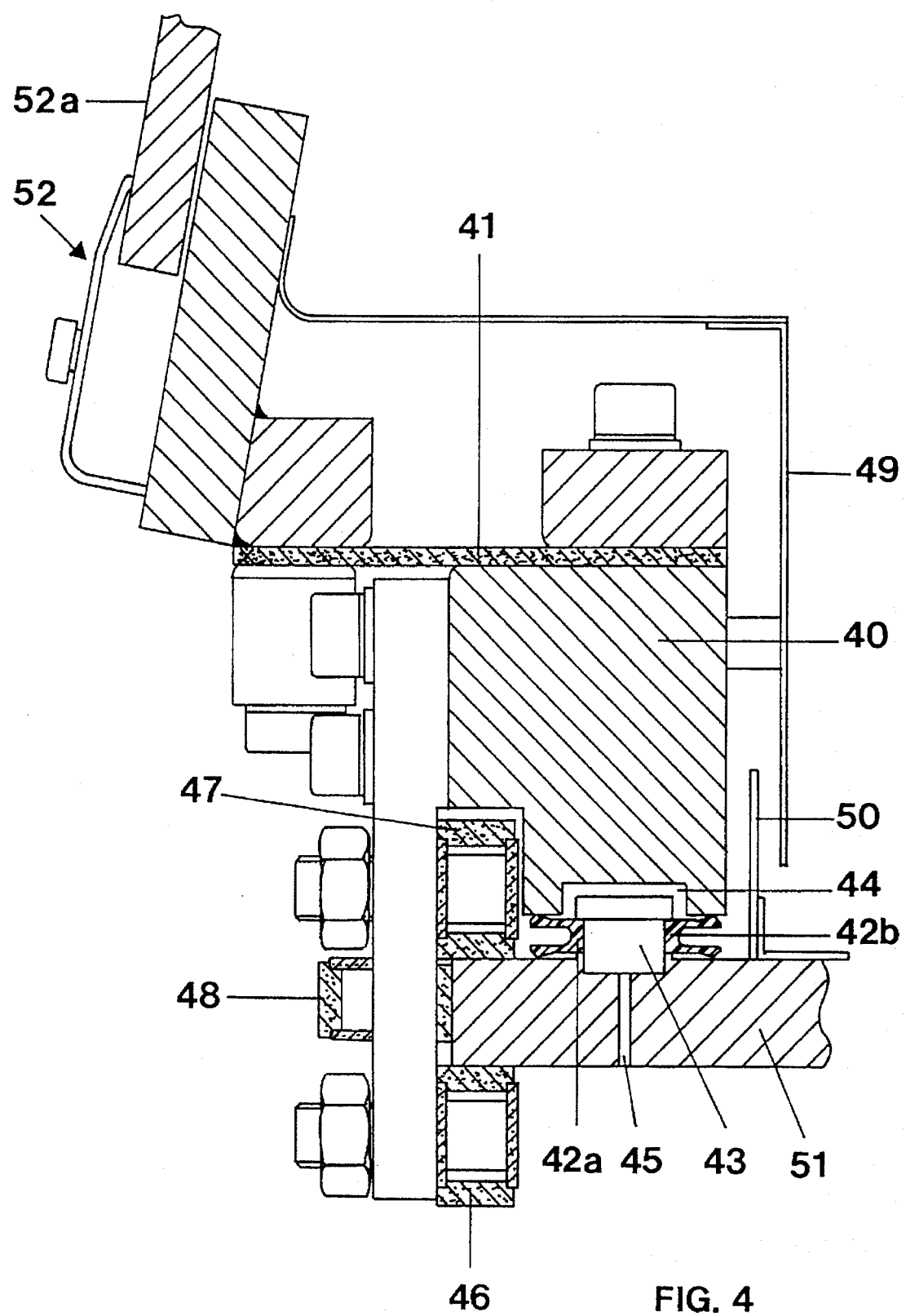
FIG. 4 is a cross section through a second embodiment of the seal of the bottom member of the glove box.

Construction of the seal of FIG. 4

FIG. 4 shows a cross section through a second embodiment of a seal of the glove box. This second embodiment differs from the first embodiment of the glove box seal only by the seal of the bottom 51 of the glove box which corresponds, generally, to plate 2, FIG. 1, or plate 11, FIGS. 2 and 3.

The seal, in this embodiment, includes an annular sealing element 40, which is screwed to the side parts 52a of the glove box hood 52 via a rubber plate 41. Hood 52 corresponds to hood 10, FIG. 2. The sealing element 40 rests on two TEFLON® sealing rings 42a, 42b, which are concentric to the vertical rotational axis (not shown in FIG. 4) of the bottom member 51 of the glove box. The sealing rings 42a, 42b are screwed to the bottom member 51 of the glove box by a plurality of fasteners 43 so that, upon rotation of the bottom member 51 of the glove box, the sealing element 40 slides on the TEFLON® sealing rings 42a, 42b. The two sealing rings 42a, 42b, together with the bottom member 51 of the glove box and the sealing element 40, form an annular barrier channel 44, which is flushed with inert gas, preferably argon, via openings 45 in the bottom member 51 of the glove box.

The bottom member 51 of the glove box and the annular sealing element 40 sliding on the TEFLON® rings 42a, 42b are positioned precisely relative to one another by a number of roller members 46, 47, 48, which are secured to the sealing element 40. Roller member 48 is circumferentially offset with respect to roller members 46, 47. Two overlapping partitions 49, 50 shield the sealing element 40 from the interior of the glove box. One of the partitions 49 is secured to the side part 52a of the glove box hood 52, and the other partition 50 is fixed to the bottom member 51 of the glove box.

The invention is not limited to the embodiment described in detail above. For instance, it is possible in the second embodiment to secure the TEFLON® sealing rings 42a, 42b to the sealing element 40, instead of to the bottom 51 of the glove box so that the bottom member 51 of the glove box slides on the sealing ring 42a, 42b. Moreover, the external shape of the glove box and in particular the shape of the glove box hood 10, 52 can have virtually any desired shape. For instance, it can be box-shaped or cylindrical in form.

We claim:

1. A glove box having a bottom (2, 11, 51), side parts (1b, 10b, 52a) and hood parts (1a, 10a, 10a'), said bottom, said sides and said hood part defining a gas-tight interior space (12), wherein, in accordance with the invention, said bottom (2, 11, 51) is rotatable;

product holders (3, 14) are provided, gas-tightly secured to said bottom, and formed with a through-duct (23) for gas-tightly receiving products (4, 15) extending in part into the interior space (12 of the glove box and, in part, outside thereof;

said product holders being located on said bottom (2, 11, 51) along a circle or arc concentric with the axis of rotation of said bottom;

internal processing devices (16) or work-stations are provided, located within the interior space (12) of the glove box for working on the portions of the products within the interior space; and external processing devices or work-stations (18) are provided, located outside of the glove box and positioned for operating on the portions of the products (4, 15) extending outside of said product holders (3, 14).

2. The glove box of claim 1, wherein said axis of rotation is a vertical axis.

3. The glove box of claim 1, further including means (19) for increasing the pneumatic pressure within the interior space (12) to be above ambient air pressure externally of the glove box.

4. The glove box of claim 1, wherein the products (4, 15) comprise discharge vessels of high-pressure discharge lamps.

5. The glove box of claim 4, wherein the discharge vessels of said high-pressure lamps have volumes which are on the order of hundredths of a cubic centimeter.

6. The glove box of claim 1, wherein said bottom (2, 11, 51) of the glove box is relatively rotatable with respect to at least one of:

said sides (1b, 10b, 52a) and said hood (1a, 10a, 10a');

and a seal (13) is provided, for sealing said bottom (2, 11, 51) with respect to at least one of said sides and said hood, said seal including a ring-shaped sealing element (13a) and slide bearing segments (13c) secured to said sealing element.

7. The glove box of claim 6, wherein said bottom of the glove box (11, 51) is formed with a ring-shaped channel (6, 22, 44) located opposite the seal (5a, 5b; 13a, 13c; 40, 42a, 42b), and including connection means for flushing said channel with an inert gas.

8. The glove box of claim 6, further including an inflatable hose (13b) for pressing said sealing element (13a) against said bottom (2, 11).

9. The glove box of claim 8, wherein said slide bearing segments (13c) are dry slide bearings which comprise polytetrafluorethlene elements.

10. The glove box of claim 8, wherein said slide bearing segments of said seal (13) comprise a vinylidene-fluoride-hexafluorpropylene copolymerizate and, optionally, a high vacuum grease for lubricating said seal.

11. The glove box of claim 1, further including a first mounting plate (10a) for retaining the internal processing devices (16) or work stations which, at least in part, extend into the interior space (12); and a second mounting plate (17) located, with respect to the glove box, opposite the first mounting plate for retaining the external processing devices or work-stations (18), the internal processing devices or work-stations being located along a circle or arc concentric with said circle of rotation.

12. The glove box of claim 11, wherein said axis of rotation is a vertical axis;

and wherein the first mounting plate (10a) is located above said bottom (2, 11, 51) of the glove box, and the second mounting plate (17) is located below said bottom (2, 11, 51) of the glove box.

13. The glove box of claim 1, further comprising a seal for sealing said bottom with respect to at least one of said sides and said hood, and wherein said seal comprises a ring-shaped sealing element (40) gas-tightly coupled to said sides (52a) and said hood (1a);

two circular or segmental sealing rings (42a, 42b) concentric of said axis of rotation, and forming a gas-tight seal between said bottom (51) of the glove box and the ring-shaped sealing element (40); and roller elements (46, 47, 48) coupled to at least one of: said sealing element (40) and said hood (1a) and positioned for relatively accurately positioning said bottom (51) of the glove box and that ring shaped sealing element (40).

14. The glove box of claim 13, wherein the sealing rings (42a, 42b) comprise polytetrafluorethylene.

15. The glove box of claim 13, wherein the sealing rings (42a, 42b) are secured to said bottom (51) of the glove box.

* * * * *